United States Patent
Chung

(10) Patent No.: US 7,327,244 B2
(45) Date of Patent: Feb. 5, 2008

(54) VALVE DEVICE WITH PRESSURE ALARM FOR TIRE

(76) Inventor: Hui-Cheng Chung, 49, Chang Yi East 3 St., Chang Yi Li, Tai Pin City, Taichung Hsien (TW)

( * ) Notice: Subject to any disclaimer, the term of this patent is extended or adjusted under 35 U.S.C. 154(b) by 157 days.

(21) Appl. No.: 11/354,073

(22) Filed: Feb. 15, 2006

(65) Prior Publication Data

US 2007/0188315 A1    Aug. 16, 2007

(51) Int. Cl.
*B60C 23/00* (2006.01)
*B60C 23/02* (2006.01)

(52) U.S. Cl. ............ 340/447; 340/442; 340/443; 340/444; 340/445; 340/446; 340/447; 340/448; 73/146.2; 73/146.3; 73/146.4; 73/146.5; 73/146.8; 116/34 A; 116/34 B; 116/34 R

(58) Field of Classification Search ........ 340/442–448; 73/146.2, 146.3, 146.4, 146.5, 146.8; 116/34 R, 116/34 A, 34 B
See application file for complete search history.

(56) References Cited

U.S. PATENT DOCUMENTS

| | | | | |
|---|---|---|---|---|
| 4,734,674 A | * | 3/1988 | Thomas et al. | 340/447 |
| 5,557,256 A | * | 9/1996 | Achterholt | 340/442 |
| 6,006,600 A | * | 12/1999 | Cheng | 73/146.5 |
| 6,031,450 A | * | 2/2000 | Huang | 340/442 |
| 6,124,785 A | * | 9/2000 | Huang | 340/442 |
| 6,817,235 B2 | * | 11/2004 | Sapir | 73/146 |
| 6,832,573 B2 | * | 12/2004 | Evans et al. | 116/34 R |
| 6,993,962 B1 | * | 2/2006 | Ko | 73/146.5 |

FOREIGN PATENT DOCUMENTS

TW    93209317    4/2005

* cited by examiner

*Primary Examiner*—Benjamin C. Lee
*Assistant Examiner*—Lam Pham
(74) *Attorney, Agent, or Firm*—Stites & Harbison PLLC; Marvin Petry

(57) ABSTRACT

A valve device includes a metal tube fixed to a tire rim of a vehicle. A valve is mounted in an end of an air passageway of the metal tube. A transmitter includes two switches respectively connected to two contact members fixed on the metal tube. A Bourdon tube includes a fixed end in communication with the air passageway of the metal tube and a movable end. When a tire pressure of the tire is in a normal range, the movable end of the Bourdon tube is between the contact members, leading to an open circuit. When the tire pressure is too high or too low, the movable end of the Bourdon tube is in contact with one of the contact members. One of the switches is turned on to activate the transmitter to send a signal for reminding the driver of the abnormal tire pressure.

2 Claims, 6 Drawing Sheets

VALVE DEVICE WITH PRESSURE ALARM FOR TIRE

BACKGROUND OF THE INVENTION

1. Field of the Invention

The present invention relates to a valve device. More particularly, the present invention relates to a valve device with pressure alarm for a tire.

2. Description of the Related Art

A typical valve device with pressure alarm is disclosed in e.g., Taiwan Utility Model Application No. 93209317. This valve device comprises a metal housing, a transverse partitioning seat separating an interior of the metal housing into an upper compartment and a lower compartment. The transverse partitioning seat includes a central hole. The housing includes an inner shoulder in a top of the upper compartment. A valve is mounted in the lower compartment. A diaphragm is mounted on a top face of the transverse partitioning seat. A sleeve is mounted in the upper compartment and above the diaphragm, with a through-hole defined in top of the sleeve. A push rod is mounted in the sleeve, with a bottom end of the push rod abutting against the diaphragm, with a top end of the push rod extending through the through-hole of the sleeve, and with a flange formed on the push rod at a location adjacent to the bottom end of the push rod. An elastic element is mounted around the sleeve and between the flange and the top of the sleeve.

A metal contact plate is mounted on the top end of the sleeve and extends across the inner shoulder. When the tire pressure is in the normal range, the metal contact plate is moved upward by the tire pressure and thus disengaged from the inner flange. When the tire pressure is too low, the metal contact plate moves downward and comes in contact with the inner shoulder. A battery device is mounted on the top face of the metal contact plate. The battery device includes a negative pole in contact with the metal contact plate and a positive plate to which a conductive member is connected. A transmitter is mounted to the conductive member and the top of the metal housing. The transmitter includes a circuit board electrically connected to the conductive member and the metal housing. A cover is mounted around the top of the metal housing. Such a tire device sends a signal for alarm purposes only when the tire pressure is insufficient. It cannot provide an alarm effect when the tire pressure is so high that the tire may burst during driving due to friction or overload.

SUMMARY OF THE INVENTION

A valve device with pressure alarm for a vehicle in accordance with the present invention comprises a metal tube having an air passageway. A valve is mounted in an end of the air passageway. The metal tube is adapted to be fixed to a rim of a tire of a vehicle, with another end of the air passageway in communication with an air inlet of the rim. A ring projects outward from an outer circumference of the metal tube. An insulating casing encloses the ring. A shield is coupled to the casing by a cap. A conductive first contact member and a conductive second contact member fixed on the metal tube. A transmitter comprises a first switch electrically connected to the first contact member and a second switch electrically connected to the second contact member. A power source comprises a positive pole electrically connected to the transmitter and a negative pole electrically connected by a conductive member to the metal tube. A conductive Bourdon tube is mounted to the metal tube and comprises a fixed end in communication with the air passageway of the metal tube and a movable end.

When a tire pressure of the tire is in a normal range, the movable end of the Bourdon tube is between the first contact member and the second contact member, leading to an open circuit.

When the tire pressure of the tire is too high, the movable end of the Bourdon tube is in contact with the first contact member, and the first switch is turned on to activate the transmitter to send a signal.

When the tire pressure of the tire is too low, the movable end of the Bourdon tube is in contact with the second contact member, and the second switch is turned on to activate the transmitter to send a signal.

Thus, the valve device may remind the driver of abnormal tire pressure, whether too high or too low.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
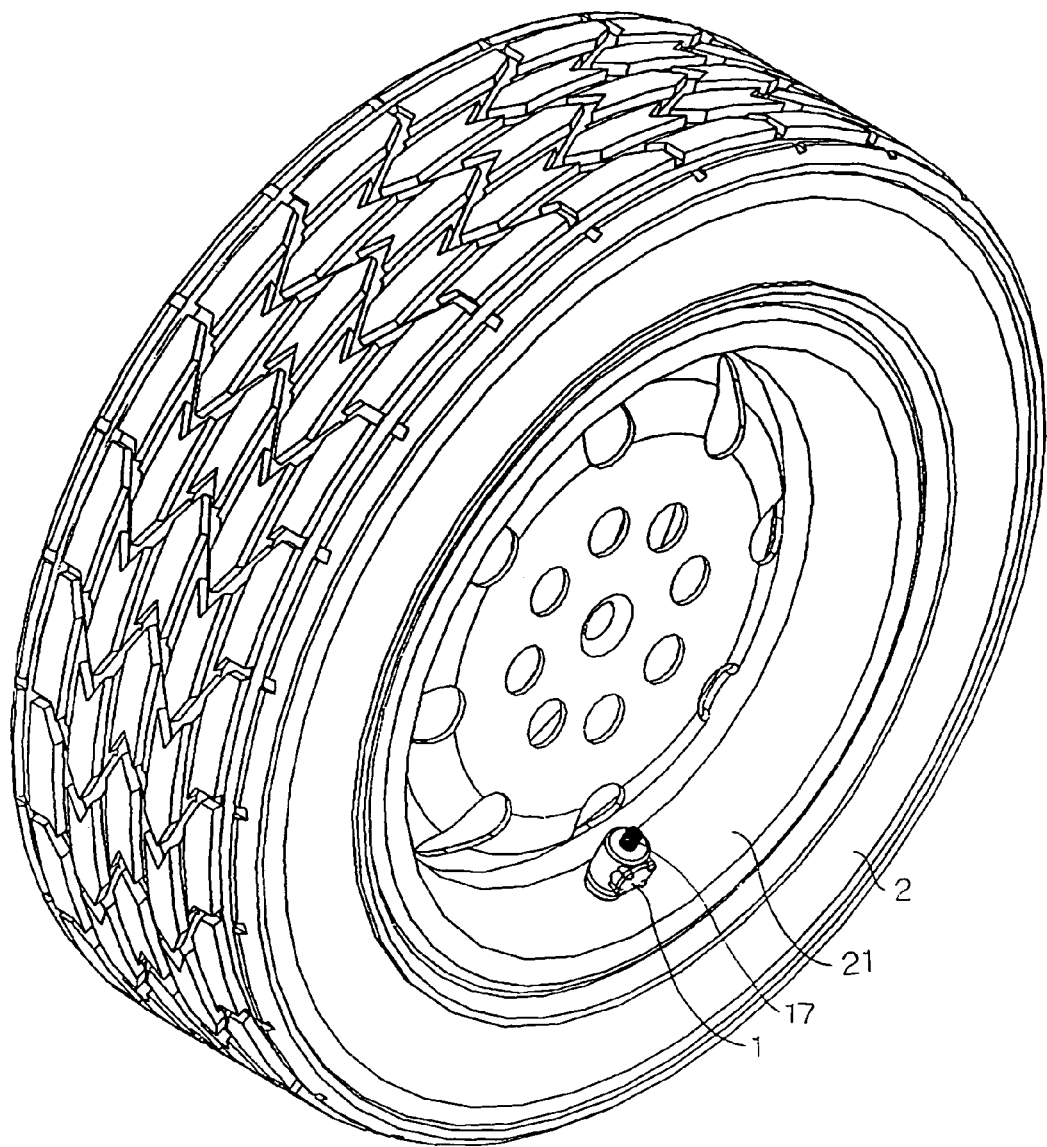
FIG. 1 is a perspective view of a tire with a valve device with pressure alarm in accordance with the present invention.
Figure 2:
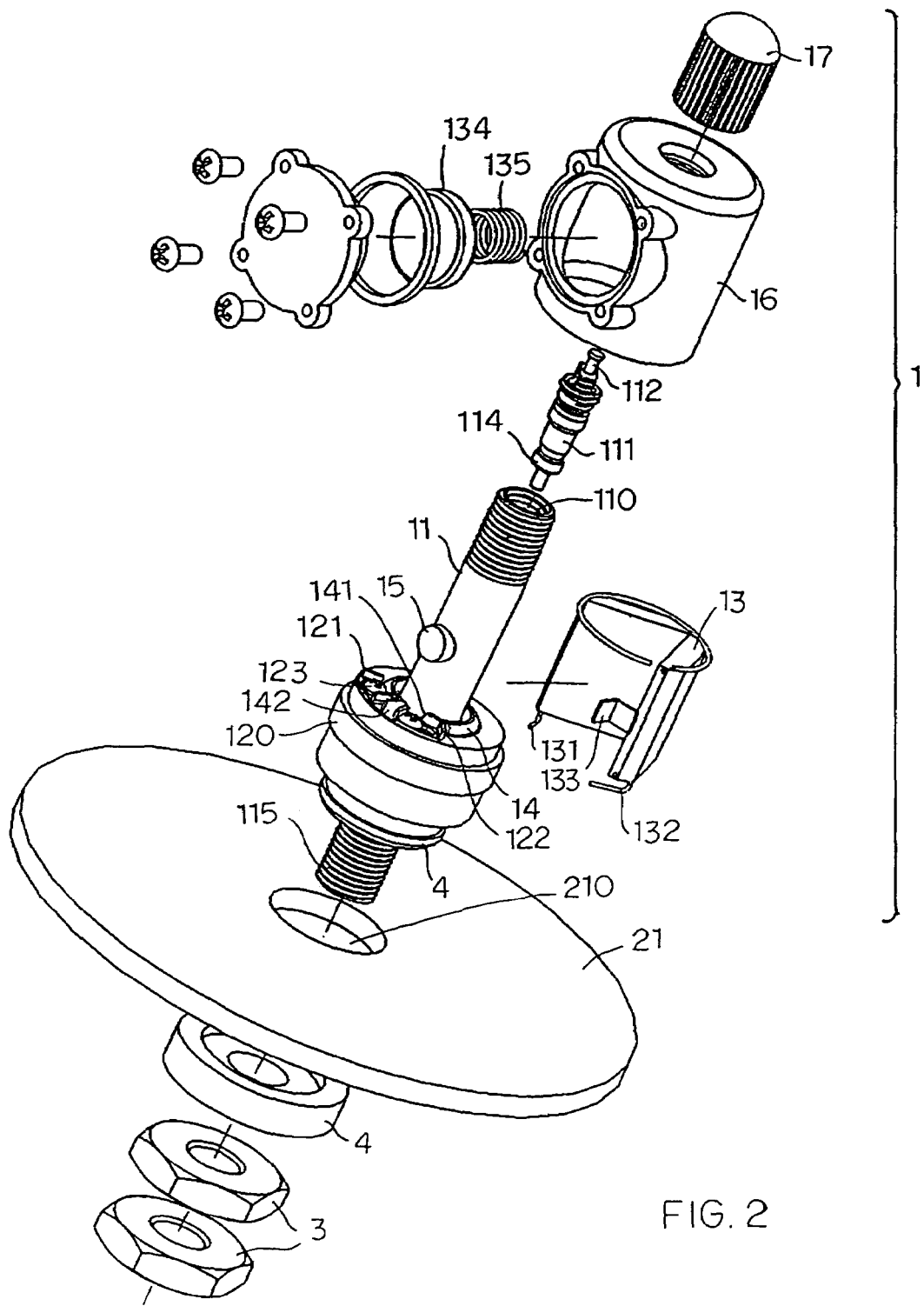
FIG. 2 is an exploded perspective view of the valve device with pressure alarm in accordance with the present invention.
Figure 3:
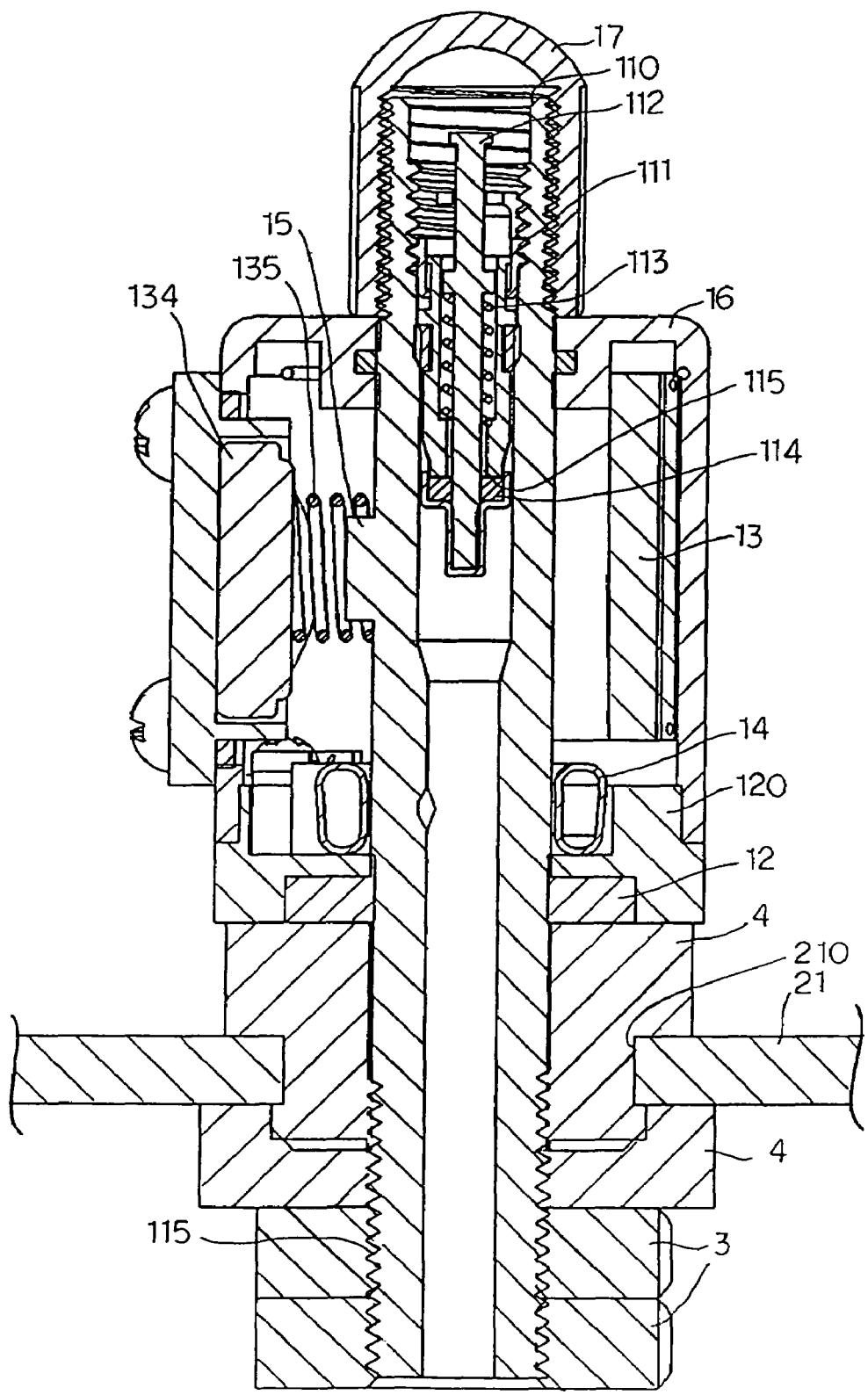
FIG. 3 is a sectional view of the valve device with pressure alarm in accordance with the present invention.

FIG. 1 illustrates a tire 2 with a valve device 1 with pressure alarm in accordance with the present invention. Referring to FIGS. 2 and 3, the valve device 1 comprises a metal tube 11 including an air passageway 110, with a valve 111 mounted in an end of the gas passageway 110. The valve 111 may be a conventional one. In this embodiment, the valve 111 comprises a valve stem 112, a plug 114, and an elastic element 113 that biases the valve stem 112 to seal an air inlet 115 when no external force is involved. The metal tube 11 is fixed to a rim 21 of the tire 2, with the other end of the air passageway 110 in communication with an air inlet 210 of the rim 21.

As illustrated in FIGS. 2 and 3, in this example, fixing members 3 and a sealing member 4 are threadedly engaged with outer threading 115 of the metal tube 11 to prevent leakage of air in the tire 2. A ring 12 projects outward from an outer circumference of the metal tube 11, and a casing 120 made of insulating material such as plastic encloses the ring 12 to shield from rain and to allow fixing of a power source 134 such as a dry cell. A shield 16 is coupled to the casing 120 by a cap 17. A conductive first contact member 121 and a conductive second contact member 122 are fixed by fasteners 123 to the casing 120. The first and second contact members 121 and 122 are made of conductive metal such as copper plate. The first contact member 121 is electrically connected to a first switch 131 of a transmitter 13 that may send a specific signal to be received by a receiver (not shown) in a vehicle having the tire 2. Upon reception of the specific signal, the receiver generates flashes or buzzes to remind the driver of the fact that the tire pressure is too high. The second contact member 122 is electrically connected to a second switch 132 of the transmitter for sending another specific signal to the receiver. Upon reception of the specific signal, the receiver generates flashes or buzzes to remind the driver of the fact that the tire pressure is too low.

The transmitter 13 is electrically connected by a conductive member 133 to the positive pole of the power source 134. The negative pole of the power source 134 is electrically connected to the metal tube 11 by a conductive member such as a conductive compression spring 135. To prevent the conductive member 135 from sliding, an end of the conductive member 135 is mounted to a protrusion 15 on the metal tube 11, and a conductive Bourdon tube 14 is mounted on the metal tube 11, with a fixed end 141 of the Bourdon tube 14 in communication with the air passageway 110.

Figure 4:
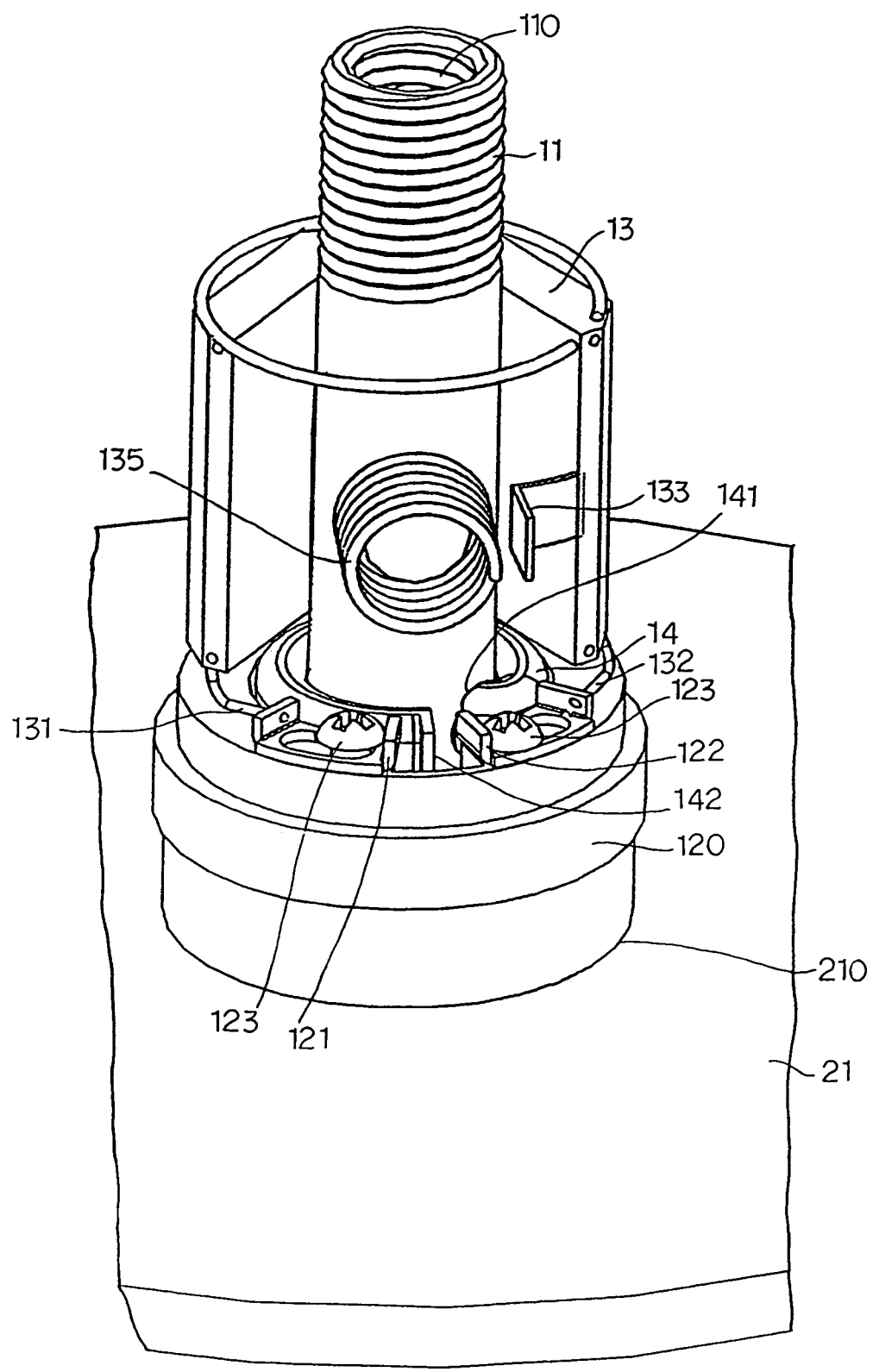
FIG. 4 is a perspective view illustrating the valve device in the normal pressure range.

In a case that the tire pressure is in the normal range, a movable end 142 of the Bourdon tube 14 is between the first contact member 121 and the second contact member 122, leading to an open circuit, as shown in FIG. 4.

Figure 5:
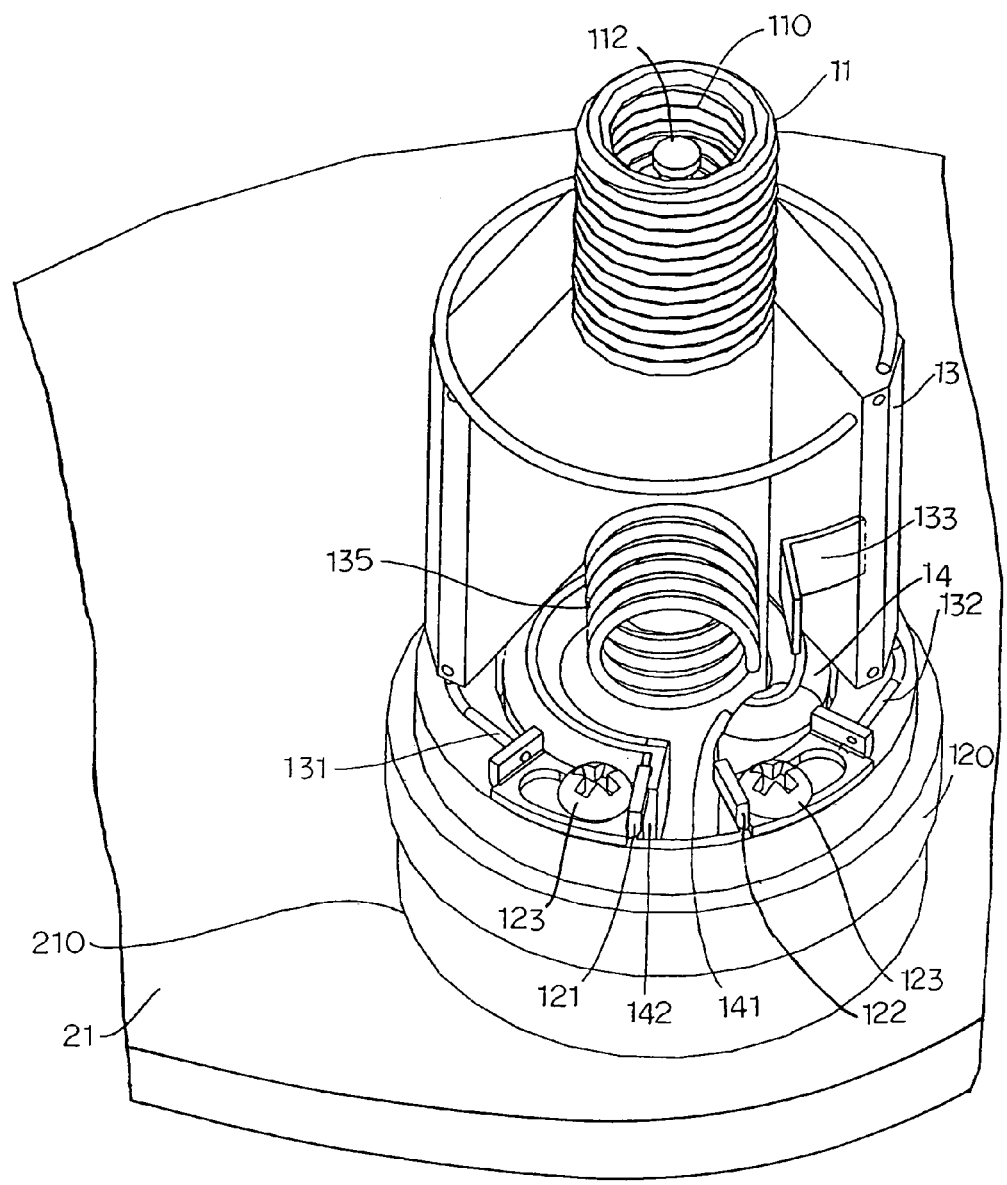
FIG. 5 is a view similar to FIG. 4, wherein the pressure of the tire is too high.

When the tire pressure is too high, since the fixed end 141 of the Bourdon tube 14 is in communication with the air passageway 110 of the metal tube 11, which, in turn, is in communication with an interior of the tire 2, the movable end 142 of the Bourdon tube 14 moves outward and thus comes in contact with the first contact switch 121, leading to a closed circuit, as shown in FIG. 5. The first switch 131 is turned on to activate the transmitter 13 to send a signal to the receiver. In response, the receiver generates flashes or buzzes to remind the driver of the fact that the tire pressure is too high.

Figure 6:
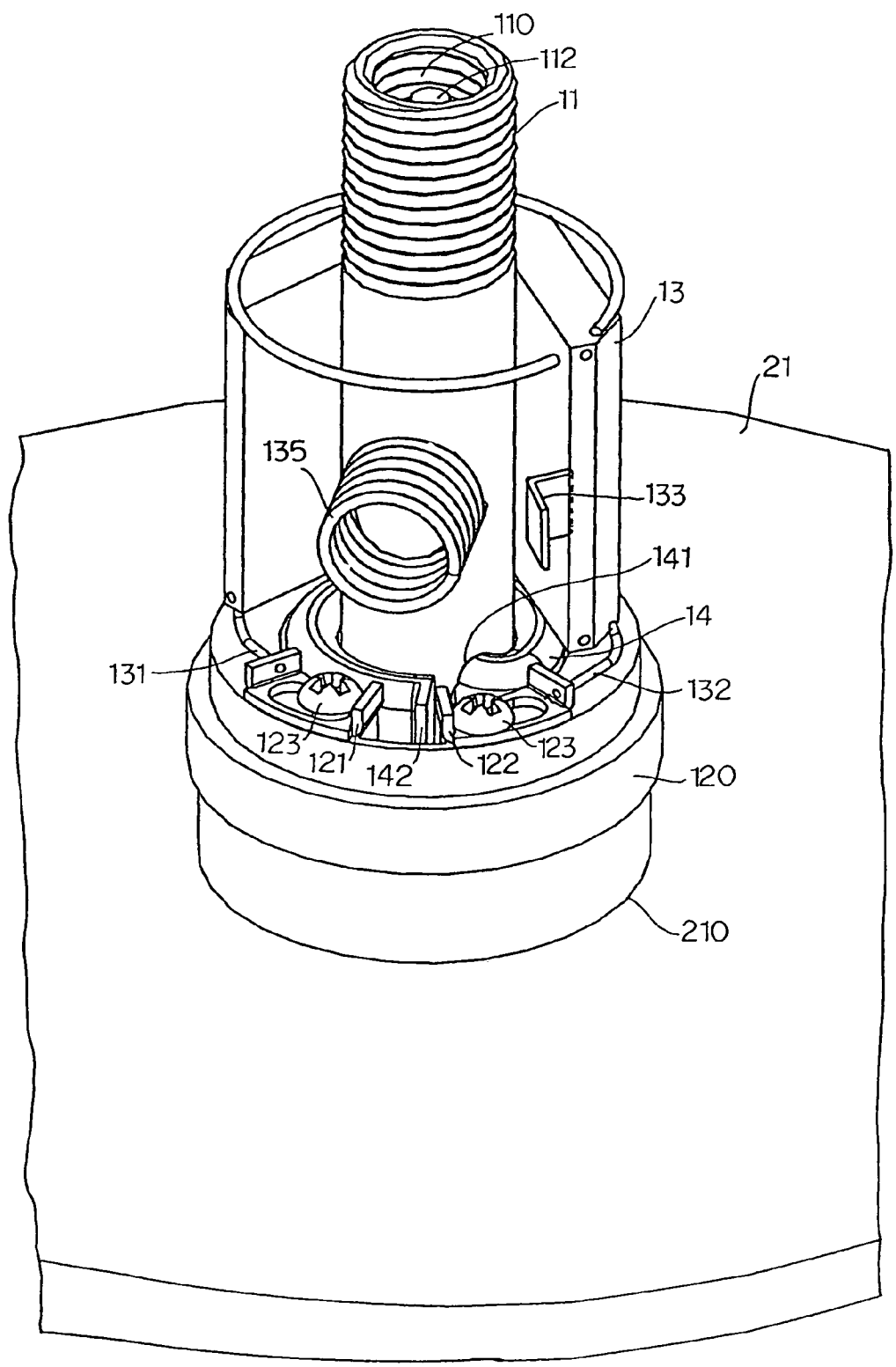
FIG. 6 is a view similar to FIG. 4, wherein the pressure of the tire is too low.

When the tire pressure is too low, the movable end 142 of the Bourdon tube 14 moves inward and thus comes in contact with the second contact switch 122, leading to a closed circuit, as shown in FIG. 6. The second switch 132 is turned on to activate the transmitter 13 to send a signal to the receiver. In response, the receiver that generates flashes or buzzes to remind the driver of the fact that the tire pressure is too low.

Although specific embodiments have been illustrated and described, numerous modifications and variations are still possible without departing from the essence of the invention. The scope of the invention is limited by the accompanying claims.

What is claimed is:

1. A valve device with pressure alarm for a vehicle, the valve device comprising:

a metal tube comprising an air passageway, a valve being mounted in an end of the air passageway, the metal tube being adapted to be fixed to a rim of a tire of a vehicle, with another end of the air passageway in communication with an air inlet of the rim;

a ring projecting outward from an outer circumference of the metal tube;

an insulating casing enclosing the ring;

a shield coupled to the casing by a cap;

a conductive first contact member fixed on the metal tube;

a conductive second contact member fixed on the metal tube;

a transmitter comprising a first switch electrically connected to the first contact member and a second switch electrically connected to the second contact member;

a power source comprising a positive pole electrically connected to the transmitter and a negative pole electrically connected by a conductive member to the metal tube;

a conductive Bourdon tube mounted to the metal tube, the Bourdon tube comprising a fixed end in communication with the air passageway of the metal tube and a movable end;

wherein when a tire pressure of the tire is in a normal range, the movable end of the Bourdon tube is between the first contact member and the second contact member, leading to an open circuit;

wherein when the tire pressure of the tire is too high, the movable end of the Bourdon tube is in contact with the first contact member, the first switch is turned on to activate the transmitter to send a signal; and wherein when the tire pressure of the tire is too low, the movable end of the Bourdon tube is in contact with the second contact member, the second switch is turned on to activate the transmitter to send a signal.

2. The valve device with pressure alarm for a vehicle as claimed in claim 1 wherein the metal tube comprises a protrusion to which an end of the conductive member is mounted.

\* \* \* \* \*